Patented July 11, 1950

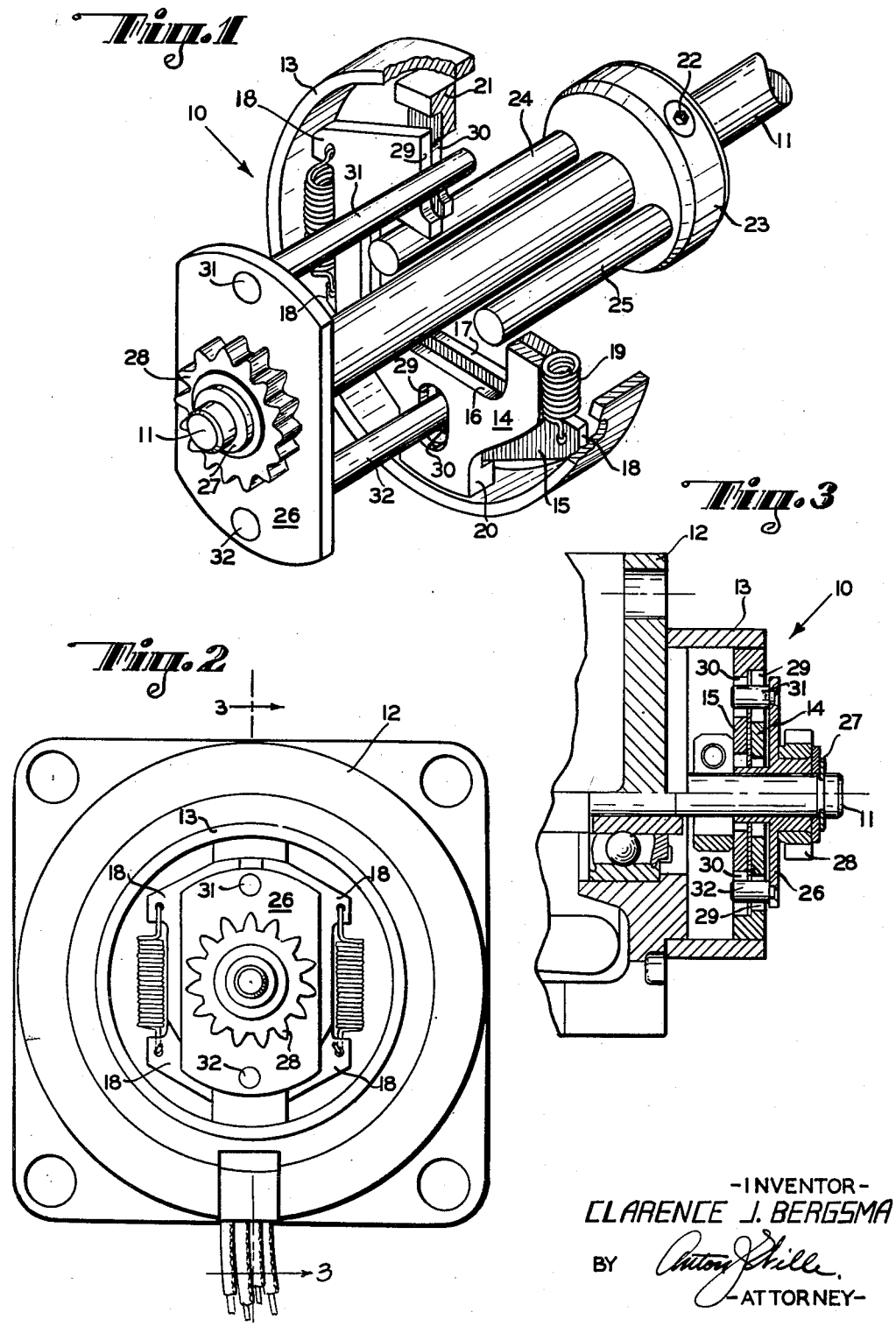

2,514,465

UNITED STATES PATENT OFFICE 2,514,465

IRREVERSIBLE DRIVE

Clarence J. Bergsma, Springfield, Mass., assignor to Bendix Aviation Corporation, Teterboro, N. J., a corporation of Delaware Application January 8, 1946, Serial No. 639,837

3 Claims. (Cl. 192—8)

This invention relates to irreversible power drives, and more particularly to a self-releasing torque transmitter brake through which rotary driving power may be transmitted in one direction only.

An object of my present invention is to provide a self-releasing torque transmitter brake which will be released upon rotation of the driving shaft in either direction of rotation, and which will remain locked upon application of a torque to said brake by a driven member.

Another object of the present invention is to provide a self-releasing torque transmitter brake in which the torque required of the driving shaft to release the brake may be varied from about 15 per cent to 95 per cent of the maximum torque available at the brake.

Another object of the invention is to provide a self-releasing torque transmitter brake in which the torque required to release the brake is completely available for driving the driven member after the brake has been released.

A further object of my invention is to provide a self-releasing torque transmitter brake which will seize immediately upon a reduction in torque of the driving member to a value which is less than the torque required to release said brake.

Still another object of the invention is to provide a highly improved, compact and rugged, self-releasing torque transmitter brake, which shall be relatively inexpensive to manufacture, positive and automatic in its operation, which shall have a large variety of applications in rotary power transmission systems, and yet be practical and efficient to a high degree in use.

Other objects of this invention will in part be obvious and in part hereinafter pointed out.

The invention accordingly consists in the features of construction, in the combinations of elements, and in the arrangements of parts which will be exemplified in the construction hereinafter described, and of which the scope of application will be indicated in the appended claims.

In the accompanying drawings in which one of the various possible illustrative embodiments of this invention is shown, Figure 1 is a perspective, exploded view on a slightly exaggerated scale with portions broken away, of a self-releasing torque transmitter brake embodying my invention, Figure 2 is a side elevational view of the brake mechanism affixed to a driving motor, while Figure 3 is a cross-sectional view, portions of which are shown in elevation, taken along the line 3—3 of Figure 2.

I accomplish the several objects of the invention by providing two identical brake shoe members freely suspended about a driving shaft by resilient means interconnecting the two members, and guided by slot and pin connections with the driven members. The resilient means interconnecting the two members bias the members radially with respect to the driving shaft so that the brake shoes engage the inner surface of a coaxial brake drum.

To release the brake, I provide a pair of release dogs fixed diametrically opposite each other to a collar on the driving shaft. The dogs are received within the central slotted opening in the brake shoe members provided. Upon rotation of the driving shaft, the release dogs will engage an edge of the slotted opening of each member tending to move the members radially inwardly against the bias of the resilient means. By moving the members inwardly, the brake shoes are released from the brake drum, permitting the torque of the driving shaft to be transmitted through the release dogs, to the brake members, and through the brake member guide pins to the driven member.

The torque required of the driving shaft to release the brake is dependent upon the tension of the resilient means, and upon the position of the release dogs. The torque requirements may be varied by varying either the tension of the resilient means, or by varying the radial distance of the release dogs with respect to the axis of the driving shaft. The greater the radial distance from the shaft axis, the greater will be the torque applied to overcome the tension of the resilient means to release the brake members. As soon as the brake is released, the torque available is applied through the brake to the driven member. When the torque available becomes less than that required to overcome the bias of the resilient means, the tension of the resilient means will cause the brake to seize.

Referring now in detail to the drawings, 10 designates a self-releasing torque transmitter brake embodying the invention mounted on the output shaft 11 of an electrical motor 12; the shaft forming the driving member of the hereinafter described brake. Fixed to the end wall of the motor 12 is a brake drum 13 coaxial with the motor shaft 11.

Freely mounted over the shaft 11 are two identical brake shoe members 14 and 15, said members being rotated 180° with respect to each other. The brake shoe members are formed with centrally disposed apertures 16 and 17, respectively, through which the motor shaft 11 passes. The brake shoe members are further provided with outstanding ears 18. The ears 18 of member 14 are interconnected to the ears 18 of the member 15 by means of two coil tension springs 19. Due to the tension of the springs 19, the ears 18 of the respective members are drawn together thus moving the outer ends of said members radially outwardly. The outer ends of the brake shoe members 14 and 15 are provided with the brake shoes 20 and 21, respectively. The tension of the springs 19 will thus press the brake shoes against the inner surface of the brake drum 13.

Means is now provided to release the brake mechanism upon rotation of the motor shaft 11 in either direction of rotation.

To this end there is pinned to the motor shaft 11, as by pin 22, a collar 23. Fixed in said collar and diametrically opposite each other, are two release dogs 24 and 25, the ends of said dogs extending into the apertures 16 and 17 of the brake shoe members 14 and 15.

Referring now in particular to Figures 1 and 3, it will be noted that the horizontal edges of the aperture 16 in member 14 are lower than the horizontal edges of the aperture 17 in member 15. Upon rotation of the shaft 11 in a counterclockwise direction, the dog 24 will abut the lower edge of aperture 17, while the dog 25 will abut the upper edge of aperture 16. Thus, in rotating the shaft 11 in a counterclockwise direction, the release dogs 24 and 25 will move the brake member 14 upwardly and the brake member 15 downwardly against the bias of the springs 19. The respective brake shoes 20 and 21 will be moved out of engagement with the brake drum 13 to permit rotation of the brake shoe members 14 and 15 by the drive shaft 11.

Clockwise rotation of the shaft 11 will release the brake mechanism in a similar manner. With the motor shaft 11 rotating in a clockwise direction, dog 25 will abut the lower edge of aperture 17 in member 15 while dog 24 will abut the upper edge of aperture 16 in member 14. The brake shoe members 14 and 15 will again be moved radially against the action of the springs 19 to release the brake shoes 20 and 21, as heretofore.

Relative movement of the shaft 11 with respect to the brake shoe members 14 and 15 is limited by the size of the apertures 16 and 17. A predetermined lag in torque transmission may be incorporated into the mechanism by proper design of large size apertures. Conversely, a very small lag will take place with a small size aperture in the brake members. Full torque transmission will take place when the horizontal edges of the aperture 16 register with the horizontal edges of the aperture 17 upon movement of the brake members 14 and 15 by the release dogs 24 and 25. The brake shoe members upon release, will thus rotate with the motor shaft 11 with the full torque developed by the shaft 11 available for transmission into a gear train or linkage system.

Means is now provided to transmit the torque of the motor shaft 11 to a driven member.

To this end there is rotatably mounted on the end of the motor shaft 11 coaxially therewith, a driven plate member 26, held against lateral movement thereon by a snap ring 27. Integral with the outer face of the plate 26 is a pinion 28 which is adapted to drive a gear train (not shown). The brake shoe members 14 and 15 are provided with elongated vertical slots 29 and 30 on the center line of said members so arranged that slots 29 of member 14 will register with the slots 30 of the member 15. Fixed into the plate 26 in a suitable manner, and on the center line thereof, are two guide pins 31 and 32. The ends of the guide pins 31 and 32 are slideably received within the elongated slots 29 and 30 in the members 14 and 15.

Upon rotation of the motor shaft 11 and the subsequent release of the brake shoes 20 and 21, the rotation of the shaft 11 will be transmitted to the pinion 28 of plate member 26 through the dogs 24 and 25, the brake shoe members 14 and 15 and the guide pins 31 and 32.

The torque required of the motor shaft 11 in releasing the brake as herein described is dependent upon the tension of the interconnecting springs 19 and the radial distance of the release dogs 24 and 25. Increasing the tension of the springs 19 would require a greater torque to be developed by the motor shaft 11 to overcome the bias of said springs in releasing the brake members. A greater or lesser torque may be applied to release the brake members by the release dogs depending upon the radial distance of the release dogs with respect to the axis of the motor shaft 11. With the radial distance of the release dogs small, a small torque will be applied to overcome the bias of the tension springs 19. At greater radial distances from the axis of shaft 11, the mechanical advantage is increased thus providing a greater torque application to the members 14 and 15 by the motor shaft 11.

Attempted rotation of the motor shaft 11 by rotation of the pinion 28 will be prevented by the brake mechanism disclosed. The vertical edges of the slotted apertures 29 and 30 in the brake shoe members 14 and 15 are in absolute registry. The torque applied to the guide pins 31 and 32 will be applied to both brake shoe members equally and at right angles to their permitted movement. The brake shoes thus remain in engagement with the brake drum and rotation of the motor shaft 11 prevented.

It will thus be seen that there is provided a self-releasing torque transmitter brake in which the several objects of this invention are achieved and which is well adapted to meet the conditions of practical use.

As various possible embodiments might be made of the above invention and as various changes might be made in the embodiment above set forth, it is to be understood that all matter set forth herein, or shown in the accompanying drawings, is to be interpreted as illustrative and not in a limiting sense.

Having thus described my invention, I claim as new and desire to secure by Letters Patent:

1. A self-releasing torque transmitter brake comprising, a driving shaft and a coaxial driven member, guide means on said driven member, a pair of brake members formed with centrally disposed apertures freely mounted juxtaposition over said driving shaft by way of said apertures and on said guide means; brake shoes carried by said members, a brake drum coaxial with said shaft, tension springs interconnecting said pair of members tending to bias the same radially outwardly with respect to the axis of said driving shaft to engage said brake shoes with said brake member, the edges of said apertures being disaligned; a collar fixed to said shaft, and a pair of release dogs fixed diametrically opposite each other on said collar, the ends of said dogs being received within the apertures of said pair of members to move said pair of members radially inwardly with respect to said driving shaft to align the edges of said apertures releasing said brake shoes from said brake drum upon rotation of said driving shaft, and to rotate said driven member through said pair of members and said guide means.

2. A self-releasing torque transmitter brake comprising, a driving shaft and a coaxial driven member, guide means on said driven member, a pair of brake members formed with apertures freely mounted juxtaposition over said driving shaft by way of said apertures and on said guide means; brake shoes carried by said members, a brake drum coaxial with said shaft, tension springs interconnecting said pair of members tending to bias the same radially outwardly with respect to the axis of said driving shaft to engage said brake shoes with said brake member, the edges of said apertures being disaligned; a collar fixed to said shaft, and a pair of release dogs fixed on said collar, the ends of said dogs being received within the apertures of said pair of members to move said pair of members radially inwardly with respect to said driving shaft to align the edges of said apertures releasing said brake shoes from said brake drum upon rotation of said driving shaft, and to rotate said driven member through said pair of members and said guide means.

3. A self-releasing torque transmitter brake comprising, a driving shaft and a driven member, guide means on said driven member, a pair of brake members formed with apertures and freely mounted juxtaposition over said driving shaft by way of said apertures and on said guide means; brake shoes carried by said members, a brake drum coaxial with said shaft, tension springs interconnecting said brake members tending to bias the same radially outwardly with respect to the axis of said driving shaft to engage said brake shoes with said brake member, the edges of said apertures in said brake members being disaligned; diametrically opposed release means on said driving shaft received within the apertures of said brake members to move said brake members radially inwardly with respect to said driving shaft to align the edges of said apertures for releasing said brake shoes from said brake drum upon rotation of said driving shaft, and to rotate said driven member through said brake members and said guide means.

CLARENCE J. BERGSMA.

REFERENCES CITED

The following references are of record in the file of this patent:

UNITED STATES PATENTS

| Number | Name | Date |
|---|---|---|
| 1,043,178 | Waite | Nov. 5, 1912 |
| 1,613,093 | Gessler | Jan. 4, 1927 |
| 1,617,745 | Cousinard | Feb. 15, 1927 |
| 2,051,400 | Taylor | Aug. 18, 1936 |
| 2,223,217 | Little | Nov. 26, 1940 |

FOREIGN PATENTS

| Number | Country | Date |
|---|---|---|
| 810,787 | France | Jan. 6, 1937 |